(12) United States Patent
Bhatnagar

(10) Patent No.: US 12,078,091 B2
(45) Date of Patent: Sep. 3, 2024

(54) SYSTEM AND METHOD FOR FILTERING EXHAUST GASES OF A VEHICLE

(71) Applicant: Rishi Bhatnagar, Delhi (IN)

(72) Inventor: Rishi Bhatnagar, Delhi (IN)

( * ) Notice: Subject to any disclaimer, the term of this patent is extended or adjusted under 35 U.S.C. 154(b) by 0 days.

(21) Appl. No.: 17/622,556

(22) PCT Filed: Aug. 6, 2019

(86) PCT No.: PCT/IB2019/056667
§ 371 (c)(1),
(2) Date: Dec. 23, 2021

(87) PCT Pub. No.: WO2020/260935
PCT Pub. Date: Dec. 30, 2020

(65) Prior Publication Data
US 2022/0356824 A1 Nov. 10, 2022

(30) Foreign Application Priority Data
Jun. 25, 2019 (IN) .............................. 201911025268

(51) Int. Cl.
*F01N 3/021* (2006.01)
*B01D 53/34* (2006.01)
(Continued)

(52) U.S. Cl.
CPC ........... *F01N 3/021* (2013.01); *B01D 53/346* (2013.01); *B01D 53/92* (2013.01); *B60Q 9/00* (2013.01);
(Continued)

(58) Field of Classification Search
CPC .......... F01N 3/021; F01N 5/025; F01N 11/00; F01N 2370/40; F01N 2570/04;
(Continued)

(56) References Cited

U.S. PATENT DOCUMENTS

2013/0158838 A1* 6/2013 Yorke ................. B60W 10/115
  701/123
2013/0232958 A1* 9/2013 Ancimer ............ B01D 53/9495
  422/111
(Continued)

FOREIGN PATENT DOCUMENTS

| CN | 108487972 A | 9/2018 | |
| CN | 209308795 U * | 8/2019 | ............ F01N 1/082 |
| EP | 3276134 A1 | 1/2018 | |

OTHER PUBLICATIONS

Machine Translation of CN-209308795U (Year: 2019).*
(Continued)

*Primary Examiner* — Brandon D Lee
(74) *Attorney, Agent, or Firm* — Holzer Patel Drennan

(57) ABSTRACT

A system and method for filtering exhaust gases of a vehicle is disclosed, that are based on an exhaust filter assembly includes an enclosure having an inlet coupled with an end of an exhaust pipe to allow exhaust gases of the vehicle into the enclosure, a filter element fitted with the enclosure to adsorb gaseous particles, moisture, and unburned fuel mist particles of the exhaust gases, sensors to sense gaseous particles adsorbed on the filter element, and generate first signals based on the sensed gaseous particles; a control unit; and a communication unit. The control unit includes processors to: receive the generated first signals, and generate second signals based on the received first signals. The communication is configured to transmit the second signals to computing devices of users to notify the users. Thermoelectric generator is adapted to convert heat energy of the exhaust gases into electric power.

9 Claims, 2 Drawing Sheets

(51) Int. Cl.
  *B01D 53/92* (2006.01)
  *B60Q 9/00* (2006.01)
  *F01N 5/02* (2006.01)
  *F01N 11/00* (2006.01)

(52) U.S. Cl.
  CPC .............. *F01N 5/025* (2013.01); *F01N 11/00* (2013.01); *F01N 2370/40* (2013.01); *F01N 2570/04* (2013.01); *F01N 2570/10* (2013.01); *F01N 2570/12* (2013.01); *F01N 2570/14* (2013.01); *F01N 2570/22* (2013.01)

(58) Field of Classification Search
  CPC .............. F01N 2570/10; F01N 2570/12; F01N 2570/14; F01N 2570/22; F01N 2560/05; F01N 2900/1606; B01D 53/346; B01D 53/92; B60Q 9/00
  See application file for complete search history.

(56) References Cited

U.S. PATENT DOCUMENTS

| | | | |
|---|---|---|---|
| 2014/0116796 A1* | 5/2014 | Poulin | F01N 13/08 60/281 |
| 2014/0150413 A1* | 6/2014 | Backhaus-Ricoult | F01N 3/033 60/299 |
| 2017/0284268 A1 | 10/2017 | Nakagawa et al. | |
| 2019/0277173 A1* | 9/2019 | Dean | F01N 3/0821 |
| 2020/0294330 A1* | 9/2020 | Vigild | G07C 5/085 |

OTHER PUBLICATIONS

International Searching Authority, Indian Patent Office, International Search Report and Written Opinion for PCT/IB2019/056667, date mailed: Jan. 10, 2019, 8 pages.

* cited by examiner

SYSTEM AND METHOD FOR FILTERING EXHAUST GASES OF A VEHICLE

TECHNICAL FIELD

The present disclosure relates to the technical field of exhaust gases purifier in vehicles. More specifically, it pertains to an improved exhaust gases purification arrangement with thermoelectric elements for filtering and collecting gaseous products, as well as soot and dirt of exhaust gases of an internal combustion (IC) engine and utilising heat energy of the exhaust gases to produce electric power.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Global warming is considered to be one of the greatest present-day problems. In accordance with present-day scientific studies, its main cause lies in the increase of emissions of greenhouse gases such as carbon dioxide ($CO_2$), methane (CH4), and oxides of nitrogen primarily because of burning of fossil fuels. These emissions are caused by human actions in connection with factories, industrial installations, thermal power plants, automobiles, aircraft, etc. About a quarter of global human-originated $CO_2$ emissions are currently estimated to come from mobile sources, i.e., automobiles, trucks, buses and trains that are powered by an internal combustion engines (ICE).

In the world today there are about thirty million new vehicles produced each year. In the operation of internal combustion engines in motor vehicles which employ as fuel a hydrocarbon, the combustion efficiency of the fuel-air mixture burned is relatively low, resulting in not only products of combustion, which include various combinations of oxygen, hydrogen, carbon and nitrogen, but also including in the products of combustion soot, dirt and other various solids in pulverulent or particle form, as well as raw fuel gases and harmful gases including carbon monoxide and carbon dioxide.

Pollution of air through the combustion of automotive fuels, as well as burning of other fuels in factories and for heating purposes, has become a most serious problem at present time. It is well established at the present time that the cumulative effect of the products of combustion from internal combustion engines is a hazard to human health.

A conventional technique to reduce such air pollution includes catalytic converters for destruction or elimination of noxious components by catalysis, especially by admixture of secondary air into the exhaust gases after initial catalytic reduction of nitrogen oxides, followed by catalytic oxidation of residual hydrocarbons, carbon monoxide, etc., in various types of apparatus or catalytic mufflers especially designed for this purpose. However, the conventional catalytic converters are not efficient and are expensive. Besides, the heat in the exhaust gases is not utilized in the conventional catalytic converters, so that the heat in the exhaust gases is wasted and the energy consumption is increased.

There is, therefore, a need in the art to provide a simple, efficient and cost effective exhaust gases purification arrangement with an electric generator for a vehicle to remove undesirable particulate and chemical contaminants from the exhaust gases of an internal combustion engine of the vehicle as well as utilize the waste heat of the exhaust gases to generate electric power.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide an improved system for filtering exhaust gases of a vehicle.

An object of the present disclosure is to provide an exhaust gases purification arrangement with a thermoelectric element for a vehicle to filter exhaust gases of the vehicle as well as utilise heat energy of the exhaust gases to produce electric power.

An object of the present disclosure is to provide an improved exhaust gases filtration system for vehicle for filtering and collecting harmful gaseous products, as well as soot and dirt of exhaust gases.

Another object of the present disclosure is to provide a simple and cost effective system for filtering exhaust gases of a vehicle to reduce carbon footprints.

Still another object of the present disclosure is to provide an improved method for filtering exhaust gases of a vehicle.

Yet another object of the present disclosure is to provide an efficient system and method which can be easily implemented for filtering exhaust gases of a vehicle as well as converting waste heat of the exhaust gases into electric power.

These and other objects of the present invention will become readily apparent from the following detailed description taken in conjunction with the accompanying drawings.

SUMMARY

The present disclosure relates to the technical field of exhaust gases purifier in vehicles. More specifically, it pertains to an improved exhaust gases purification arrangement with a thermoelectric element for filtering and collecting harmful gaseous and solid particles resulting as products of combustion an IC engine as well as converting heat energy of exhaust gases into electric energy.

In an aspect, the present disclosure provides a system for filtering exhaust gases of a vehicle, the system can include an exhaust filter assembly includes an enclosure having an inlet coupled with an end of an exhaust pipe of the vehicle to allow exhaust gases of an internal combustion engine of the vehicle into the enclosure, at least one filter element fitted with the enclosure to adsorb gaseous particles, moisture particles, odours, unburned fuel mist particles and undesired fumes of the exhaust gases, and allow remaining exhaust gases to flow out of the enclosure, a set of sensors operatively coupled to the filter element to sense gaseous particles adsorbed on the filter element, and generate first signals in real-time based on the sensed gaseous particles; a control unit operatively coupled to the set of sensors, the control unit comprises one or more processors and a memory coupled to the one or more processors, the memory storing instructions executable by the one or more processors to: receive the generated first signals, and generate in real-time second signals based on the received first signals, the second signals corresponding to an amount of the sensed gaseous particles adsorbed on the filter element; and a communication unit operatively coupled to the control unit to transmit the second signals to one or more computing devices of one or more users to notify the one or more users.

In an embodiment, the system can include a clamp to enable fitment of the enclosure with the exhaust pipe of the vehicle.

In an embodiment, the filter element can be an activated carbon filter.

In an aspect, the exhaust filter assembly can include one or more thermoelectric elements configured with the filter element. The one or more thermoelectric elements can be adapted to convert heat energy of the exhaust gases into electric power.

In an embodiment, the one or more thermoelectric elements can be thermoelectric generators.

In an embodiment, the gaseous particles can be selected from any or a combination of carbon monoxide (CO) particles, and carbon dioxide ($CO_2$) particles, nitrogen particles, and sulphur oxide (SOx) particles.

In an embodiment, the communication unit can be selected from any of a WI-FI module, GSM module and a Bluetooth module.

In an embodiment, the one or more computing devices are selected from any of servers, computers, laptops, tablets, and smart phones.

In another aspect of the present disclosure provides a method for filtering exhaust gases of a vehicle, the method can include steps of: providing an enclosure with an inlet to allow exhaust gases of an internal combustion engine of the vehicle into the enclosure, wherein the inlet is coupled with an end of an exhaust pipe of the vehicle; adsorbing, by an activated carbon filter, gaseous particles, moisture particles, odours, unburned fuel mist particles and undesired fumes of the exhaust gases, and allow remaining exhaust gases to flow out of the enclosure, wherein the filter element is fitted with the enclosure; sensing, by a set of sensors, gaseous particles adsorbed on the filter element, wherein the set of sensors are coupled to the filter element; receiving, by a control unit having one or more processors, the generated first signals; generating in real-time, by the one or more processors, second signals based on the received first signals, wherein the second signals correspond to an amount of the sensed gaseous particles adsorbed on the filter element; and transmitting, using a communication unit, the second signals to one or more computing devices of one or more users to notify the one or more users; and converting, by one or more thermoelectric generators, heat energy of the exhaust gases into electric power. The communication unit can be selected from any of a WI-FI module, GSM module and a Bluetooth module.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
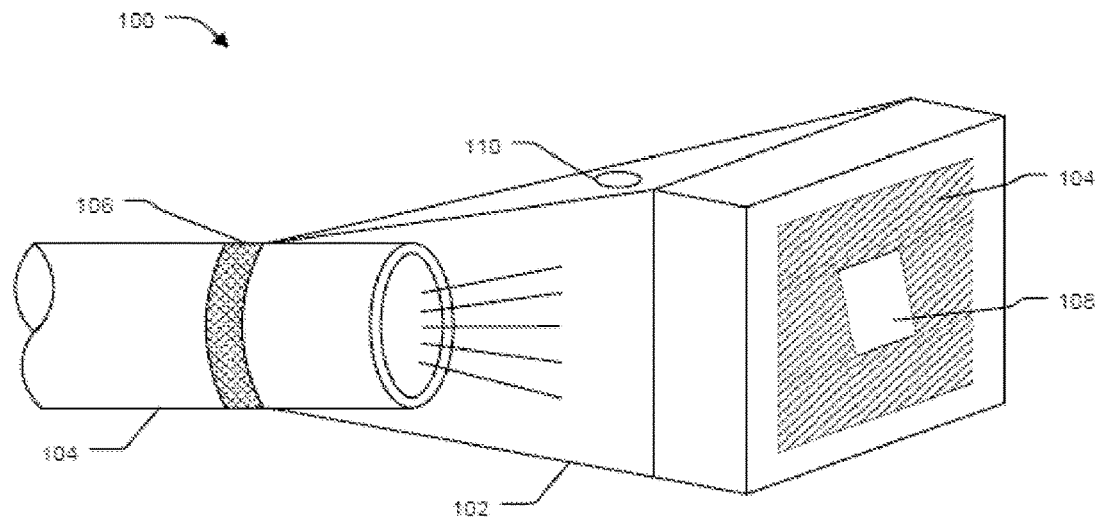
FIG. 1 illustrates an exemplary representation of an exhaust filter assembly of the proposed system for filtering exhaust gases of a vehicle, in accordance with an embodiment of the present disclosure.

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

Embodiments explained herein relate to an exhaust gases purifier in a vehicle. More particularly, it pertains to an improved exhaust gases purification system with thermoelectric elements for filtering and collecting harmful gaseous products, as well as soot and dirt of exhaust gases of a vehicle and utilising heat energy of the exhaust gases to produce electric power.

In an aspect, the disclosed system can include an exhaust filter assembly includes an enclosure having an inlet coupled with an end of an exhaust pipe of the vehicle to allow exhaust gases of an internal combustion engine of the vehicle into the enclosure, at least one filter element fitted with the enclosure to adsorb any or a combination of gaseous particles, moisture particles, odours, unburned fuel mist particles and undesired fumes of the exhaust gases, and allow remaining exhaust gases to flow out of the enclosure, a set of sensors operatively coupled to the filter element to sense gaseous particles adsorbed on the filter element, and generate first signals in real-time based on the sensed gaseous particles; a control unit operatively coupled to the set of sensors, the control unit comprises one or more processors and a memory coupled to the one or more processors, the memory storing instructions executable by the one or more processors to: receive the generated first signals, and generate in real-time second signals based on the received first signals, the second signals corresponding to an amount of the sensed gaseous particles adsorbed on the filter element; and a communication unit operatively coupled to the control unit to transmit the second signals to one or more computing devices of one or more users to notify the one or more users.

In an embodiment, the filter element can be an activated carbon filter.

In an aspect, the exhaust filter assembly can include one or more thermoelectric elements such as thermoelectric generators/thermoelectric cells to convert heat energy of the exhaust gases into electric power.

It is to be appreciated that while various embodiments have been explained herein with reference to system and method for filtering exhaust gases of a vehicle, they can with suitable modifications that would be apparent to those skilled in the art, be applied for other similar applications such as for filtering exhaust gases of an internal combustion engine in industries and all such applications are well within the scope of the present disclosure without any limitations.

In another aspect of the present disclosure provides a method for filtering exhaust gases of a vehicle, the method can include steps of: providing an enclosure with an inlet to allow exhaust gases of an internal combustion engine of the vehicle into the enclosure, wherein the inlet is coupled with an end of an exhaust pipe of the vehicle; adsorbing, by at least one activated carbon filter, any or a combination of gaseous particles, moisture particles, odours unburned fuel mist particles, and undesired fumes/smoke of the exhaust gases and allow remaining exhaust gases to flow out of the enclosure, wherein the filter element is fitted with the enclosure; sensing, by a set of sensors, gaseous particles adsorbed on the filter element, wherein the set of sensors are coupled to the filter element; receiving, by a control unit having one or more processors, the generated first signals; generating in real-time, by the one or more processors, second signals based on the received first signals, wherein the second signals correspond to an amount of the sensed gaseous particles adsorbed on the filter element; and transmitting, using a communication unit, the second signals to one or more computing devices of one or more users to notify the one or more users; and converting, by one or more thermoelectric generators, heat energy of the exhaust gases into electric power.

FIG. 1 illustrates an exemplary representation of an exhaust filter assembly of the proposed system for filtering exhaust gases of a vehicle, in accordance with an embodiment of the present disclosure. The disclosed exhaust filter assembly 100 can includes an enclosure 102 having an inlet coupled with an end of an exhaust pipe 104 of the vehicle to allow exhaust gases of an IC engine (not shown) of the vehicle into the enclosure 102, at least one filter element 104 can be fitted with the enclosure 102 to adsorb any or a combination of gaseous particles, moisture particles, odours, unburned fuel mist particles and undesired fumes of the exhaust gases, and allow remaining exhaust gases to flow out of the enclosure 102.

In an embodiment, the filter element 104 can be an activated carbon filter.

In an embodiment, a clamp 106 can be used to enable fitment of the enclosure 102 with the exhaust pipe 104 of the vehicle. The clamp 106 can be a jublee clamp.

In an embodiment, the filter assembly 100 can include a set of sensors (not shown) operatively coupled to the filter element 204 to sense gaseous particles adsorbed on the filter element, and generate first signals in real-time based on the sensed gaseous particles.

In an embodiment, the gaseous particles can be selected from any or a combination of carbon monoxide (CO) particles, and carbon dioxide ($CO_2$) particles, nitrogen particles, and sulphur oxide (SOx) particles.

In an exemplary embodiment, the set of sensors can be selected from a group of sensors including CO sensors, $CO_2$ sensors, nitrogen particle sensors, and SOx sensors.

In an embodiment, the exhaust filter assembly 100 can include one or more thermoelectric elements such as a thermoelectric element 108 configured with the filter element 104. The thermoelectric element 108 can be adapted to convert heat energy of the exhaust gases into electric power.

In an embodiment, the thermoelectric element 108 can be thermoelectric generators which work on a principle of Seebeck effect.

In an embodiment, the electric power produced by the thermoelectric element 108 can be stored in a power storage battery for further use.

In an exemplary embodiment, the activated carbon filter 104 can work by adsorption that is the process by which a gas bonds to the surface of a solid. In this case, the solid is the activated carbon filter, which adsorbs at least 60% of its weight in airborne pollutants. Exhaust gases passes through the filter element where airborne gases, chemicals, and odours react chemically with the surface of the activated carbon filter, effectively sticking to it. The clean air then flows out of the filter element 104. The activated carbon filter 104 can adsorb vapours in the exhaust gases as well as have a large capacity for removing organic molecules like solvents. The activated carbon filters can effectively work like a sponge. The more activated carbon in the filter element, the more pollutants it can remove and the longer the filter lasts.

In an embodiment, the filter element 104 employed for filtering and collecting gaseous products, as well as soot and dirt, may be readily removed when fully loaded and replaced by new filtering element.

In an embodiment, the enclosure 102 can include one or more opening such as an opening 110 on a side wall.

In an embodiment, the enclosure 102 can be made of ay of a metal, metal alloy, high heat resistant polymeric material and like.

Figure 2:
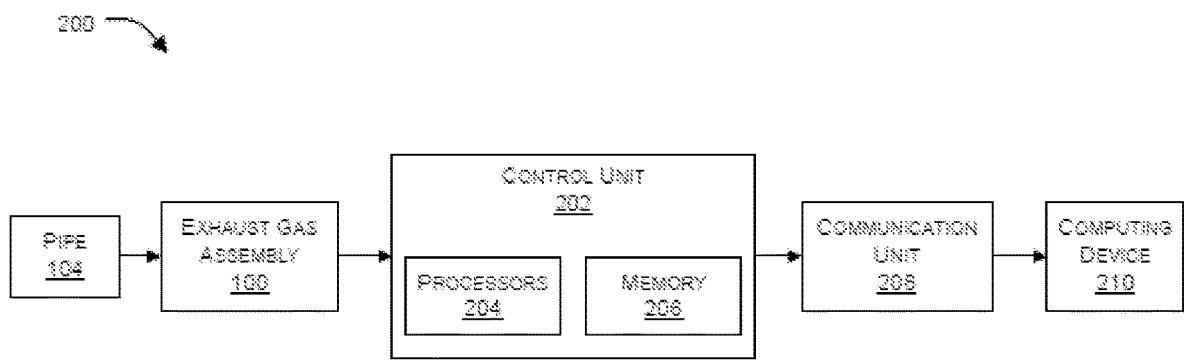
FIG. 2 illustrates an exemplary block diagram representation of the proposed system using the exhaust filter assembly for filtering exhaust gases of a vehicle, in accordance with an embodiment of the present disclosure.

FIG. 2 illustrates an exemplary block diagram representation of the proposed system using the exhaust filter assembly for filtering exhaust gases of a vehicle, in accordance with an embodiment of the present disclosure. The disclosed system 200 can include a control unit 202 operatively coupled to the set of sensors of the exhaust gas assembly 100, and a communication unit 208.

In an embodiment, the control unit 202 can include one or more processors 204 and a memory 206 coupled to the processors 204. The one or more processor(s) 204 can be implemented as one or more microprocessors, microcomputers, microcontrollers, digital signal processors, central processing units, logic circuitries, and/or any devices that manipulate data based on operational instructions. Among other capabilities, the one or more processor(s) 204 are configured to fetch and execute computer-readable instructions stored in the memory 206. The memory 206 can store one or more computer-readable instructions or routines, which can be fetched and executed to create or share the data units over a network service. The memory 206 can include any non-transitory storage device including, for example, volatile memory such as RAM, or non-volatile memory such as EPROM, flash memory, and the like.

In an embodiment, the one or more processors 204 can be configured to receive the generated first signals by the set of sensor of the exhaust gas assembly 100.

In an embodiment, the one or more processors 204 can be configured to generate in real-time second signals based on the received first signals. The second signals corresponding to an amount of the sensed gaseous particles adsorbed on the filter element of the exhaust gas assembly 100.

In an embodiment, the communication unit 208 can be operatively coupled to the control unit 202. The communication unit 208 can be adapted to transmit the second signals to one or more computing devices 210 of one or more users to notify the one or more users about the amount of adsorbed gaseous particle on the filter element.

In an embodiment, the communication unit 208 can be selected from any of a WI-FI module, GSM module and a Bluetooth module, and the like.

In an embodiment, the computing devices 210 can be selected from any of servers, computers, laptops, tablets, smart phones and the like.

Figure 3:
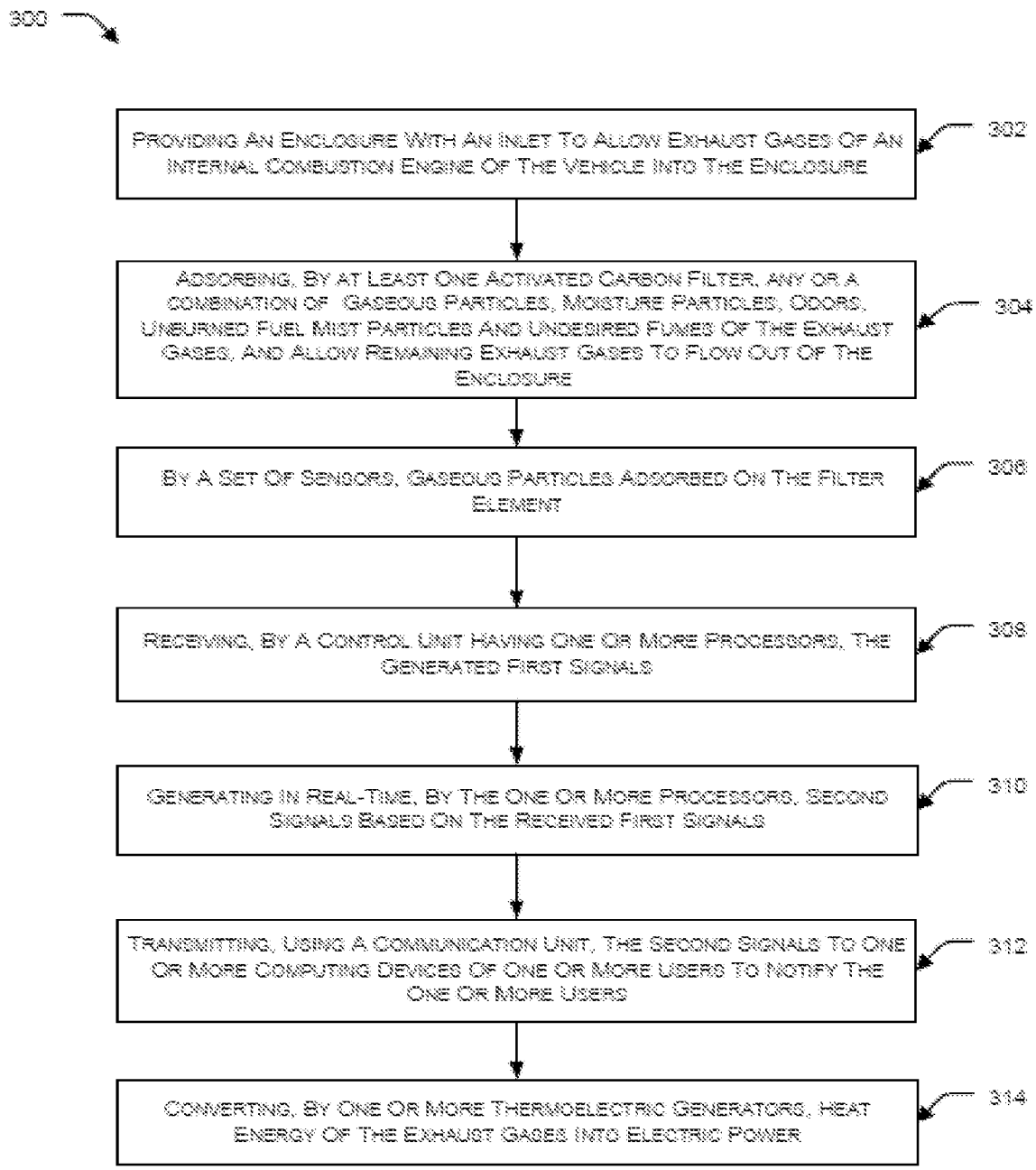
FIG. 3 illustrates an exemplary flow diagram representation of the proposed method for filtering exhaust gases of a vehicle, in accordance with an embodiment of the present disclosure

FIG. 3 illustrates an exemplary flow diagram representation of the proposed method for filtering exhaust gases of a vehicle, in accordance with an embodiment of the present disclosure. The disclosed method 300 can include at step 302, providing an enclosure with an inlet to allow exhaust gases of an internal combustion engine of the vehicle into the enclosure, wherein the inlet is coupled with an end of an exhaust pipe of the vehicle.

In an embodiment, the disclosed method 300 can include at step 304, adsorbing, by at least one activated carbon filter, any or a combination of gaseous particles, moisture particles, odours, unburned fuel mist particles and undesired fumes of the exhaust gases, and allow remaining exhaust gases to flow out of the enclosure. The filter element is fitted with the enclosure.

In an embodiment, the disclosed method 300 can include at step 306, sensing, by a set of sensors, gaseous particles adsorbed on the filter element, and generate first signals in real-time based on the sensed gaseous particles. The set of sensors can be operatively coupled to the filter element.

In an embodiment, the disclosed method 300 can include at step 308, receiving, by a control unit having one or more processors, the generated first signals, and at step 310, generating in real-time, by the one or more processors, second signals based on the received first signals. The second signals correspond to an amount of the sensed gaseous particles adsorbed on the filter element.

In an embodiment, the disclosed method 300 can include at step 312, transmitting, using a communication unit, the second signals to one or more computing devices of one or more users to notify the one or more users. The communication unit can be selected from any of a WI-FI module, GSM module and a Bluetooth module. The one or more devices can be selected from any of servers, computers, laptops, tablets, smart phones, and the like.

In an embodiment, the disclosed method 300 can include at step 314, converting, by one or more thermoelectric generators, heat energy of the exhaust gases into electric power.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an improved system for filtering exhaust gases of a vehicle.

The present disclosure provides exhaust gases purification an arrangement with a thermoelectric element for a vehicle to filter exhaust gases as well as utilise heat energy of the exhaust gases to produce electric power.

The present disclosure provides an improved exhaust gases filtration system for vehicle for filtering and collecting harmful gaseous products, as well as soot and dirt of exhaust gases.

The present disclosure provides a simple and cost effective system for filtering exhaust gases of a vehicle to reduce carbon footprints.

The present disclosure provides an improved method for filtering exhaust gases of a vehicle.

PEC The present disclosure provides an efficient system and method which can be easily implemented for filtering exhaust gases of a vehicle as well as converting waste heat of the exhaust gases into electric power.

I claim:

1. A system for filtering exhaust gases of a vehicle, the system comprising:
   an exhaust filter assembly comprising:
      an enclosure having an inlet coupled with an end of an exhaust pipe of the vehicle to allow exhaust gases of an internal combustion engine of the vehicle into the enclosure;
      at least one filter element fitted with the enclosure to adsorb gaseous particles and adsorb any or a combination of moisture particles, odours and unburned fuel mist particles of the exhaust gases, and allow remaining exhaust gases to flow out of the enclosure;
      a set of sensors operatively coupled to the filter element to sense gaseous particles adsorbed on the filter element, and generate first signals in real-time based on the sensed gaseous particles, wherein the set of sensors comprises carbon monoxide (CO) sensors, carbondioxide ($CO_2$) sensors, nitrogen particle sensors, and sulphur oxide (SOx) sensors, wherein at least one filter element is an activated carbon filter;
   a control unit operatively coupled to the set of sensors, the control unit comprises one or more processors and a memory coupled to the one or more processors, the memory storing instructions executable by the one or more processors to:
      receive the generated first signals;
      generate in real-time second signals based on the received first signals, the second signals corresponding to an amount of the sensed gaseous particles adsorbed on the filter element; and
   a communication unit, having the one or more processors, to transmit the second signals to one or more computing devices of one or more users to notify the one or more users.

2. The system as claimed in claim 1, wherein the exhaust filter assembly comprises one or more thermoelectric elements configured with the filter element, the one or more thermoelectric elements are adapted to convert heat energy of the exhaust gases into electric power.

3. The system as claimed in claim 2, wherein the one or more thermoelectric elements are thermoelectric generators.

4. The system as claimed in claim 1, wherein the gaseous particles are selected from any or a combination of carbon monoxide (CO) particles, and carbondioxide (C02) particles, nitrogen particles, and sulphur oxide (SOx) particles.

5. The system as claimed in claim 1, wherein the communication unit is selected from any of a WI-FI module, GSM module and a Bluetooth module.

6. The system as claimed in claim 1, wherein the one or more computing devices are selected from any of servers, computers, laptops, tablets, and smart phones.

7. The system as claimed in claim 1, wherein the system comprises a clamp to enable fitment of the enclosure with the exhaust pipe of the vehicle.

8. A method for filtering exhaust gases of a vehicle, the method comprising steps of:
   providing an enclosure with an inlet to allow exhaust gases of an internal combustion engine of the vehicle into the enclosure, wherein the inlet is coupled with an end of an exhaust pipe of the vehicle;
   adsorbing, by at least one activated carbon filter, gaseous particles and any or a combination of moisture particles, odours and unburned fuel mist particles of the exhaust gases and allow remaining exhaust gases to flow out of the enclosure, wherein the filter element is fitted with the enclosure;
   sensing, by a set of sensors, gaseous particles adsorbed on the at least one filter element, and generating first signals in real-time based on the sensed gaseous particles, wherein the set of sensors are operatively coupled to the at least one filter element, wherein the set of sensors comprises carbon monoxide (CO) sensors, carbondioxide ($CO_2$) sensors, nitrogen particle sensors, and sulphur oxide (SOx) sensors;
   receiving, by a control unit having one or more processors, the generated first signals;
   generating in real-time, by the one or more processors, second signals based on the received first signals, wherein the second signals correspond to an amount of the sensed gaseous particles adsorbed on the filter element;
   transmitting, by a communication unit having the one or more processors, the second signals to one or more computing devices of one or more users to notify the one or more users; and
   converting, by one or more thermoelectric generators, heat energy of the exhaust gases into electric power.

9. The method as claimed in claim 8, wherein the communication unit is selected from any of a WI-FI module, GSM module and a Bluetooth module.

* * * * *